(12) United States Patent
Liu et al.

(10) Patent No.: US 12,709,301 B2
(45) **Date of Patent: *Aug. 18, 2026**

(54) SYSTEMS AND METHODS FOR AUTONOMOUS VEHICLE MOTION CONTROL AND MOTION PATH ADJUSTMENTS

(71) Applicant: Aurora Operations, Inc., Pittsburgh, PA (US)

(72) Inventors: Chenggang Liu, Pittsburgh, PA (US); David McAllister Bradley, Pittsburgh, PA (US); Nitish Thatte, Pittsburgh, PA (US); Colin Jeffrey Green, Pittsburgh, PA (US)

(73) Assignee: AURORA OPERATIONS, INC., Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/754,461

(22) Filed: Jun. 26, 2024

(65) Prior Publication Data

US 2024/0425083 A1 Dec. 26, 2024

Related U.S. Application Data

(63) Continuation of application No. 17/062,067, filed on Oct. 2, 2020, now Pat. No. 12,049,238.
(Continued)

(51) Int. Cl.
*B60W 60/00* (2020.01)
*B60W 30/14* (2006.01)

(52) U.S. Cl.
CPC ...... *B60W 60/0025* (2020.02); *B60W 30/143* (2013.01); *B60W 60/0011* (2020.02); *B60W 2520/10* (2013.01)

(58) Field of Classification Search
CPC ........... B60W 60/0025; B60W 30/143; B60W 60/0011; B60W 2520/10; B60W 2552/53;
(Continued)

(56) References Cited

U.S. PATENT DOCUMENTS

2017/0057510 A1 3/2017 Herbach et al.
2018/0284771 A1 10/2018 Ravichandran et al.
(Continued)

FOREIGN PATENT DOCUMENTS

DE 102018212901 2/2020

OTHER PUBLICATIONS

International Search Report and Written Opinion for Application No. PCT/US2021/043924, mailed May 2, 2022, 14 pages.
(Continued)

*Primary Examiner* — James J Lee
*Assistant Examiner* — Andrew Sang Kim
(74) *Attorney, Agent, or Firm* — Dority & Manning, P.A.

(57) ABSTRACT

The present disclosure is directed to altering vehicle paths. In particular, a computing system can access map data for a geographic area. The computing system can obtain target zone data describing a target zone within the geographic area. The computing system can determine an altered nominal path to traverse the target zone. The computing system can designate a portion of the altered nominal path as a designated action region associated with the target zone. The computing system can generate a longitudinal plan for an autonomous vehicle through the geographic area based on the altered nominal path. The computing system can generate a target velocity for one or more portions of the nominal path within the designated action region. The computing system can generate a trajectory for the autonomous vehicle based on the target velocity and the altered nominal path.

17 Claims, 11 Drawing Sheets

Related U.S. Application Data

(60) Provisional application No. 63/058,789, filed on Jul. 30, 2020.

(58) Field of Classification Search
CPC ......... B60W 2556/40; B60W 2556/50; B60W 2720/10; B60W 60/00253; B60W 30/18145
See application file for complete search history.

(56) References Cited

U.S. PATENT DOCUMENTS

| | | | | |
|---|---|---|---|---|
| 2019/0080599 | A1* | 3/2019 | Ishikawa | G06V 20/582 |
| 2019/0235499 | A1 | 8/2019 | Kazemi et al. | |
| 2019/0369616 | A1* | 12/2019 | Ostafew | G08G 1/0112 |
| 2020/0089973 | A1 | 3/2020 | Efland | |
| 2020/0139959 | A1* | 5/2020 | Akella | G05D 1/0088 |
| 2020/0175558 | A1 | 6/2020 | Fujimoto et al. | |
| 2020/0180617 | A1 | 6/2020 | Tezuka et al. | |
| 2021/0132615 | A1* | 5/2021 | Passot | G01C 21/3461 |
| 2021/0197819 | A1 | 7/2021 | Okamoto et al. | |

OTHER PUBLICATIONS

International Preliminary Report on Patentability for Application No. PCT/US2021/043924, mailed Feb. 9, 2023, 9 pages.

* cited by examiner

100
REMOTE COMPUTING SYSTEM(S) 190B
NETWORK(S) 120
SERVICE ENTITY
185
OPS. COMP. SYSTEM 190A
195
VEH. SERV. REQ.
VEHICLE COMPUTING SYSTEM 110
MAP DATA 160
AUTONOMY COMPUTING SYSTEM 140
COMM. SYS. 115
135
SENSOR(S)
SENSOR DATA
155
PERCEPTION 170A
PERCEPTION DATA
PREDICTION 170B
PREDICTION DATA
MOT. PLANNING 170C
MOTION PLAN DATA
VEHICLE CONTROLLER 145
VEHICLE CONTROL SYS. 150
POS. SYS. 165
175A
175B
175C
VEH. USER DEVICES 180
105
USER 125
USER DEVICE
130

SYSTEMS AND METHODS FOR AUTONOMOUS VEHICLE MOTION CONTROL AND MOTION PATH ADJUSTMENTS

RELATED APPLICATION

This application claims priority to and the benefit of U.S. Provisional Patent Application No. 63/058,789, filed Jul. 30, 2020, and U.S. patent application Ser. No. 17/062,067, filed Oct. 2, 2020 which are hereby incorporated by reference in their entirety.

FIELD

The present disclosure relates generally to autonomous vehicles. More particularly, the present disclosure relates to path planning for autonomous vehicles.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include accessing map data for a geographic area and sensor data for the geographic area around an autonomous vehicle. The method can include accessing, by a computing system including one or more processors, map data for a geographic area, the map data including information associated with a nominal path. The method can include obtaining, by the computing system, target zone data describing a target zone within the geographic area. The method can include determining, by the computing system, an altered nominal path to traverse the target zone. The method can include designating, by the computing system, a portion of the altered nominal path as a designated action region associated with the target zone. The method can include generating, by the computing system, a longitudinal plan for an autonomous vehicle through the geographic area based on the altered nominal path. The method can include generating, by the computing system, a target velocity for one or more portions of the nominal path within the designated action region. The method can include generating, by the computing system, a trajectory for the autonomous vehicle based on the target velocity and the altered nominal path.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
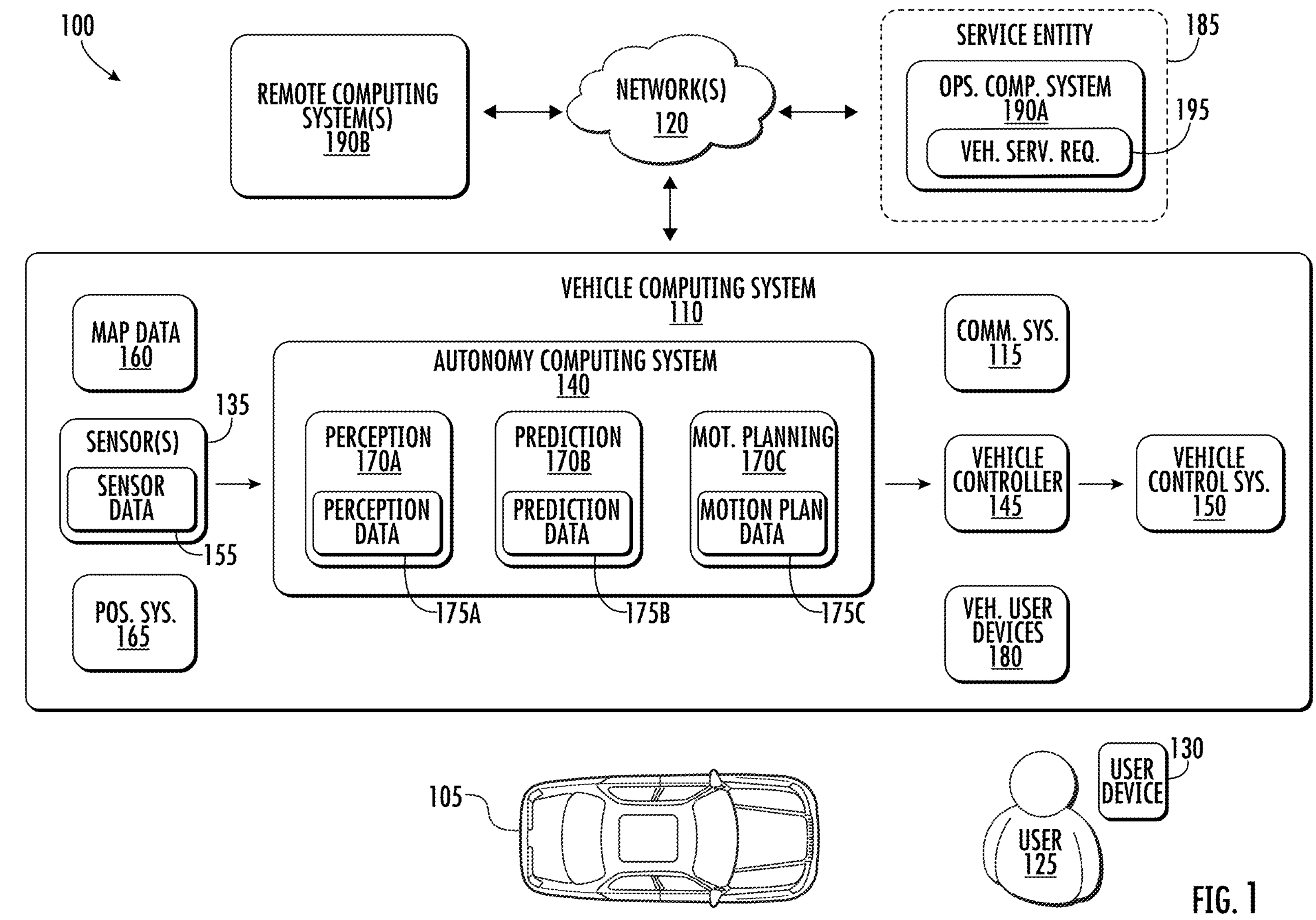
FIG. 1 depicts a block diagram of an example autonomous vehicle according to example embodiments of the present disclosure.

Generally, the present disclosure is directed to generating a motion path for a system such as an autonomous vehicle, as it moves through an environment. The autonomous vehicle may be directed to perform specific actions, such as making a turn or picking-up or dropping off a passenger or an item. To do so, a vehicle computing system associated with the autonomous vehicle can access a nominal path between a first location and a second location. A nominal path can be an ideal path included in map data that does not, at least initially, consider the objects within the vehicle's surrounding environment (e.g., a path down the center of a lane). The vehicle computing system may also receive data describing a target zone associated with a particular action. The data describing the target zone can be obtained from a remote server system.

The target zone can be, for example, a pick-up/drop-off area for passengers or items or can be an area in which the autonomous vehicle is to be positioned to prepare for a turn. The target zone may be located such that the nominal path does not originally pass through the target zone. The vehicle computing system can alter the nominal path to ensure the autonomous vehicle passes through the target zone and is thus able to perform the action for which the target zone is created (e.g., picking up or dropping of a passenger or an item, making a safe turn, and so on).

The vehicle computing system can, based on the location of the target zone, designate a portion of the nominal path as a designated action region. A designated action region can represent the portion of the nominal path that is within the target zone. Once a portion of the nominal path has been marked as the designated action region, the vehicle computing system can generate appropriate trajectories based on the nominal path representation without needing any additional information to identify the location target zone. The vehicle computing system can use this information to ensure that the autonomous vehicle performs the action (e.g., making turns, picking-up or dropping off passengers, or picking up or dropping off items) in the target zone.

Once the nominal path has been altered to pass over the target zone, the vehicle computing system can generate a longitudinal plan. A longitudinal plan can be a plan that describes how far along the nominal path the autonomous vehicle is predicted to travel during a specific time period based on a speed data for the autonomous vehicle. The vehicle computing system can set a target velocity for the autonomous vehicle for at least a portion of the designated action region. In some examples, the designated action region represents a pick-up/drop-off zone and the target velocity for at least part of the action region is zero. In other examples, the designated action region is associated with a turn assertion and the target velocity may not reach zero. In some examples, the target velocity is determined by the motion planner generating a plurality of potential velocity profiles and then evaluating each velocity profile based on one or more cost metrics (e.g., safety, comfort, efficiency, etc.) The velocity profile with the lowest cost which also performs a designated task (e.g., stops in a pickup/drop-off zone until a passenger or item is picked up or dropped off) or takes a turn safely can be selected for use as a target velocity. Using the altered nominal path, the designated action region, and one or more target velocities, the vehicle computing system can generate a trajectory for the autonomous vehicle. The vehicle computing system can generate vehicle control commands that can be used to control the autonomous vehicle along the trajectory.

In a basic example of the disclosed systems and methods, an autonomous vehicle can use a vehicle computing system to plan a path for an autonomous vehicle. The path traveled by the autonomous vehicle can be based on a nominal path. In this example, the autonomous vehicle can receive instructions to pick up a passenger at a particular location that is represented by a target zone. The vehicle computing system can alter the nominal path such that it passes through the target zone and designated a portion of the nominal path as the designated action region.

The vehicle computing system can use a speed planner included in the vehicle computing system to generate a longitudinal plan for the autonomous vehicle along the altered nominal path. As noted above, the longitudinal plan can represent the distance the autonomous vehicle is expected to travel along the nominal path in a given period of time. Based on the longitudinal plan and a determination that the autonomous vehicle will travel into the designated action region during the period of time currently being planned, the vehicle computing system can generate target velocities for the autonomous vehicle such that it will stop at a location along the altered path within the designated action region target zone. In some examples, the vehicle computing system can also determine the target heading of the autonomous vehicle at each point in the target zone.

More specifically, the above-described path alteration system can be included in an autonomous vehicle (e.g., ground-based vehicle, aerial vehicle, etc.). An autonomous vehicle can include a vehicle computing system. The vehicle computing system can be responsible for, among other functions, creating the control signals needed to effectively control an autonomous vehicle. The vehicle computing system can include an autonomy computing system. The autonomy computing system can include one or more systems that enable the autonomous vehicle to plan and/or follow a given route, receive sensor data about the environment, perceive objects within the vehicle's surrounding environment (e.g., other vehicles), predict the motion of the objects within the surrounding environment, and generate trajectories for the vehicle to follow based on the route/perceived objects/predicted object motion. The autonomy system can output data indicative of the generated trajectories and corresponding control signals can be sent to vehicle control system(s) (e.g., acceleration, steering, braking, etc. systems) to enable the autonomous vehicle to autonomously navigate (e.g., to its target destination).

To accomplish these operations, the autonomy computing system can include, for example, a perception system, a prediction system, and a motion planning system. Many of the functions performed by the perception system, prediction system, and motion planning system can be performed, in whole or in part, by one or more structured machine-learning models. Moreover, one or more of the perception system, prediction system, and/or motion planning system (or the functions associated therewith) can be combined into a single system and/or share computing resources.

To help maintain awareness of the vehicle's surrounding environment, the vehicle computing system can access sensor data from one or more sensors (e.g., LIDAR, RADAR, camera, etc.) to identify static objects and/or dynamic objects (actors) in the autonomous vehicle's environment. To help determine its position within the environment (and relative to these objects), the vehicle computing system can provide sensor data to the structured machine-learned model(s). In addition or alternatively, the autonomous vehicle can access map data (e.g., high definition map data, etc.) to determine the autonomous vehicle's current position relative to other objects in the world (e.g., bicycles, pedestrians, other vehicles, buildings, etc.), as well as map features such as, for example, lane boundaries, curbs, and so on.

The computing system of an autonomous vehicle can include a plurality of devices (e.g., physically-connected devices, wirelessly-connected devices, virtual devices running on a physical machine, etc.) that implement a software graph architecture of the autonomous vehicle. For instance, the computing devices can implement the vehicle's autonomy software that helps allow the vehicle to autonomously operate within its environment. Each device can include a compute node configured to run one or more processes. A process can include a plurality of function nodes (e.g., software functions) connected by one or more directed edges that dictate the flow of data between the plurality of function nodes. A device can execute (e.g., via one or more processors, etc.) a respective plurality of function nodes to run a respective process. The plurality of processes can be collectively configured to perform one or more tasks or services of the computing system. To do so, the plurality of processes can be configured to communicate (e.g., send/receive messages) with each other over one or more communication channels (e.g., wired and/or wireless networks). By way of example, with respect to the vehicle's onboard computing system, its processes (and their respective function nodes) can be organized into a directed software graph architecture (e.g., including sub-graphs) that can be executed to communicate and perform the operations of the autonomous vehicle (e.g., for autonomously sensing the vehicle's environment, planning the vehicle's motion, etc.).

The vehicle computing system can utilize the sensor data to identify one or more objects in the local environment of the autonomous vehicle. Using this sensor data, the vehicle computing system can generate perception data that describes one or more object(s) in the vicinity of the autonomous vehicle (e.g., current location, speed, heading, shape/size, etc.).

The generated perception data can be utilized to predict the future motion of the object(s). For example, the vehicle computing system can use the perception data to generate predictions for the movement of one or more objects as an object trajectory including one or more future coordinates/points. In some implementations, the perception and prediction functions of the vehicle computing system can be included within the same system.

The vehicle computing system can use the perception data, prediction data, map data, and/or other data to generate a motion plan for the vehicle. As noted above, one part of generating a motion plan can include altering a nominal path to ensure that the path travels over a target zone that has been generated to perform a specific activity (e.g., picking up or dropping off a passenger or item, performing a turn or U-turn, and so on). Using the altered nominal path, the vehicle computing system can generate a basis path for the autonomous vehicle to follow.

A basis path can describe a specific path for the autonomous vehicle to travel from a current location to a destination location. The basis path can be generated at a system that is remote from the autonomous vehicle and communicated to the autonomous vehicle and/or the basis path can be generated onboard the autonomous vehicle. The vehicle computing system can generate potential trajectories for the autonomous vehicle to follow as it traverses the basis path. Each potential trajectory can be executable by the autonomous vehicle (e.g., feasible for the vehicle control systems to implement). Each trajectory can be generated to comprise a specific amount of travel time (e.g., eight seconds, etc.).

The autonomous vehicle can select and implement a trajectory for the autonomous vehicle to navigate a specific segment of the route. For instance, the trajectory can be translated and provided to the vehicle control system(s) (e.g., via a vehicle interface/controller) that can generate specific control signals for the autonomous vehicle (e.g., alter steering, braking, velocity, and so on). The specific control signals can cause the autonomous vehicle to move in accordance with the selected trajectory.

The motion planning system of the autonomous vehicle can alter a nominal path for the autonomous vehicle when a specific target zone is specified. To help accomplish this, the motion planning system can include a path alteration system configured to altering the nominal path. The path alteration system can include a plurality of components or modules including, but not limited to: a path access system, a path adjuster, a speed planner, and a trajectory generator.

A path access system can access nominal path data for the autonomous vehicle based on a planned route. In some examples, the path access system can identify a nominal path for the autonomous vehicle going forward. The nominal path can represent a preferred path through a particular environment without accounting for obstacles that may exist. In some examples, the nominal path does account for permanent or semi-permanent obstacles but does not account for potential moving obstacles. In some examples, the nominal path includes a series of points, each point being represented by a set of coordinates for the location of the autonomous vehicle at a particular point in time along the nominal path (e.g., 1 second, 2 seconds, 3 seconds, and so on). Thus, each point can represent a subsequent step in a time series along that nominal path such that the nominal path is represented by connecting each of the points.

The path access system can receive instructions designating a particular area as the target zone. As discussed above, the target zone can be associated with a particular activity, such as, for example, picking up or dropping off a passenger or item, or with making a turn. Once the target zone has been established, a path adjuster can alter the nominal path laterally such that it passes through the target zone. In some examples, laterally altering the nominal path can include, for a plurality of points in the nominal path, identifying the distance from the current point to the target zone and laterally shifting the point such that it is positioned inside of the target zone. In some examples, a point in the nominal path can be laterally shifted to the center of the target zone. In other examples, the points can be shifted such that the nominal path moves in a way that does not exceed comfortable acceleration or turning limits. For example, if the target zone is an area on the shoulder of the road outside of the normal driving lanes, the path adjuster can first move one or more points of the nominal path laterally into the target zone. Once this has been accomplished, the path adjuster can determine whether the acceleration and changes in heading that result from the lateral adjustment exceed one or more threshold values for velocity, acceleration, or jerk. If the determined acceleration and changes in heading result in values for velocity, acceleration, or jerk that exceed threshold values, the path adjuster can laterally alter points before and after the target zone to ensure that the autonomous vehicle can move into the target zone without exceeding the predetermined threshold limit values.

In some examples, the path adjuster can alter one or more features of the map data or other data representing the current environment around the autonomous vehicle. The current environment around the autonomous vehicle can include the geographic area around the autonomous vehicle that is visible to the sensors included in the autonomous vehicle (e.g., within sensor range/field of view of a camera, a LIDAR sensor, a RADAR sensor, and so on). Additionally or alternatively, the current environment around the autonomous vehicle can include the geographic area within a predetermined distance of the nominal path (e.g., 100 meters from the path).

In one example, the path adjuster can alter the autonomous vehicles internal representation of the lane boundaries associated with the current lane of travel of the autonomous vehicle. In this way, when candidate trajectories are evaluated, the trajectories will not be assigned a high cost for crossing a lane boundary. When a turn is requested, the data representing the lane boundary can be altered such that the lane boundary appears to be shifted such that the autonomous vehicle can move to the side of the road in preparation for the turn. Thus shifting of the lane boundary can include, for example, altering the representation of the lane boundary stored onboard the autonomous vehicle (e.g., based on the map data, the perception data, etc.).

The path adjuster can designate a portion of the nominal path as an action region or a region associated with a special action (e.g., picking-up or dropping-off a passenger or item or making a turn, etc.). The designated action region can be the portion of the nominal path in which the special action is to be performed. The designated action region can be assigned to one or more points in the nominal path. A first point can be designated as the starting point of the designated action region and a second point can be designated as the ending point of the designated action region and all points in between the first point and the second point can be included in the special action region.

Once the nominal path has been altered, the speed planner included in the path alteration system can generate a longitudinal plan for the autonomous vehicle. The longitudinal plan can follow the altered nominal path and can represent the longitudinal distance the autonomous vehicle is expected to travel during a particular period of time (e.g., eight seconds). For example, the longitudinal plan can indicate that the autonomous vehicle is to travel two-hundred ninety-six feet in an eight second time period in the forward direction of travel associated with a particular roadway.

Once the longitudinal plan has been generated, the speed planner can generate one or more speed targets for one or more points in the special action region. The speed targets can include a planned velocity, a target pose, and a target heading.

A planned velocity can be a velocity that the speed planner determines that the autonomous vehicle needs to have at a particular point in time and/or in distance. Thus, if a speed planner determines that that autonomous vehicle needs to come to a stop within five seconds, the speed planner can generate target velocities for the autonomous vehicle that represent the autonomous vehicle slowing at each time interval before that time such that it can safely come to a stop as desired. For example, if the autonomous vehicle starts at 25 m/s, the speed planner can generate a plan in which the planned velocity for the autonomous vehicle is reduced by 5 m/s for each second of the next five seconds. Similarly, the target pose can represent the position and orientation of the autonomous vehicle should have at a particular point in time to meet the planned velocity goals. The target heading for an autonomous vehicle at a particular time can be based on the intended future path of the autonomous vehicle, such that some controls such as the direction of the steering wheel or tire direction can be in the appropriate state to travel the intended future path.

A trajectory generator can generate one or more potential trajectories. The trajectories can include, among other things, one or more heading values and one or more acceleration values. To do so, the trajectory generator can access the altered nominal path, the target velocities, poses, and headings. Using this information, the trajectory generator can generate one or more candidate trajectories, each representing a potential variation of movement from the current position, through one or more intermediate points, to a target position. A trajectory can be translated and provided to the vehicle control system(s) (e.g., via a vehicle interface/controller) that can generate specific control signals for the autonomous vehicle (e.g., alter steering, braking, velocity, and so on).

The following provides an end-to-end example of the technology described herein. An autonomous vehicle can include a vehicle computing system. The vehicle computing system can access map data for a geographic area. The map data can include data associated with a nominal path. In some examples, the nominal path includes a series of geographic coordinates associated with a series of time steps. In some examples, each geographic coordinate can have an associated position and pose for the autonomous vehicle.

The vehicle computing system can obtain target zone data describing a target zone within the geographic area. In some examples, the target zone can be a zone associated with picking up or dropping off a passenger or item. In some examples, the target zone can be identified based on data provided by a remote computing system. For instance, an operations computing system associated with a service entity (e.g., offering/coordinating vehicle services, etc.) can provide data associated with a service request and/or a route for the autonomous vehicle. The data can include a target zone that is designated for picking-up or dropping-off a passenger and/or item. In some examples, the vehicle computing system can select a target zone. For example, the vehicle computing system can obtain data indicative of a geographic location associated with a pick-up event or a drop off event (e.g., a curbside waiting area adjacent to an address associated with a user). The vehicle computing system can select, based on the map data, the target zone to include the geographic location associated with the pick-up event or the drop off event. This can include, for example, an area along a curb and/or road shoulder where the autonomous vehicle can pull over to pick-up a user and where the autonomous vehicle may straddle a lane boundary while in the target zone.

The path alteration system can designate a portion of the altered nominal path as a designated action region associated with the target zone. To do so, the path alteration system can identify a first coordinate in the series of geographic coordinates that fall within the target zone. The path alteration system can identify a last coordinate in the series of geographic coordinates that fall within the target zone. The path alteration system can designate the first coordinate, the last coordinate, and any coordinates between the first and last coordinates in the series of coordinates as being included in the designated action region.

In some examples, the designated action region can be a zone associated with making a vehicle action. The vehicle action can include, for example, a turn. In some examples, the turn can be a right turn, a left turn, or a U-turn. The path alteration system can set a target velocity for at least one portion of the nominal path within the designated action region (e.g., the section of the nominal path that has been designed as being within the target zone) to the preferred turning velocity.

The vehicle computing system can determine an altered nominal path to traverse the target zone. To do so, the path alteration system can determine, based on data representing the position of one or more lane boundaries included in the map data, whether the target zone is at least partially outside the one or more lane boundaries included in the map data. In accordance with a determination that the target zone is at least partially outside the one or more boundaries lanes included in the map data, the path alteration system can alter the data representing the position of one or more lane boundaries such that the entire target zone is within a space designated by the altered data representing the one or more lane boundaries.

The vehicle computing system can laterally alter a plurality of coordinates in the designated action region such that the altered nominal path traverses the target zone. The vehicle computing system can determine whether the altered nominal path meets one or more smoothness requirements. The one or more smoothness requirements can represent a determination that the altered nominal path, when travelled by the autonomous vehicle, does not exceed one or more predetermined threshold values for acceleration, turning rate, velocity, and jerk. In accordance with a determination that the altered nominal path does not meet the one or more smoothness requirements, the vehicle computing system can laterally alter one or more coordinates outside the designated action region such that the nominal path meets the one or more smoothness requirements. In some examples, the smoothness requirements can be associated with bounded limits on one or more derivatives of polynomials associated with the nominal path. For example, a polynomial can be determined to be associated with or otherwise represent the nominal path (or a given trajectory based on the nominal path). One or more derivatives can be calculated based on this polynomial (e.g., a 3rd, 4th, or 5th order derivative). These derivatives can be evaluated to ensure that they do not exceed predetermined limits on velocity, acceleration, or jerk.

The vehicle computing system can generate a longitudinal plan for an autonomous vehicle through the geographic area based on the altered nominal path. The vehicle computing system can generate a target velocity for one or more portions of the nominal path within the designated action region. The vehicle computing system can, for at least one portion of the nominal path, set the target velocity to zero (e.g., in the event that the autonomous vehicle is stopping in the target zone to pick-up a passenger/item).

The vehicle computing system can generate a trajectory for the autonomous vehicle based on the target velocity and the altered nominal path. The vehicle computing system can generate data to maintain the velocity of the autonomous vehicle at zero until after the pick-up event or the drop off event has occurred. In some examples, the trajectory is generated based at least in part on the longitudinal plan and the target velocities.

Various means can be configured to perform the methods and processes described herein. For example, a computing system can include data access unit(s), path adjustment unit(s), plan generation unit(s), velocity planning unit(s), trajectory generation unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to access map data for a geographic area (the map data being associated with a nominal path) and obtaining target zone data describing a target zone within the geographic area. For example, a path alteration system can access map data from a map database that includes a nominal path and target zone data from a remote server system. A data access unit is one example of a means for accessing map data for a geographic area (the map data being associated with a nominal path) and obtaining target zone data describing a target zone within the geographic area.

The means can be configured to determine an altered nominal path to traverse the target zone and designate a portion of the altered nominal path as a designated action region associated with the target zone. For example, the path alteration system can alter the nominal path such that it passes through the target zone. A portion of the target zone can then be designated as an action region. A path adjustment unit is one example of a means for determining an altered nominal path to traverse the target zone and designating a portion of the altered nominal path as a designated action region associated with the target zone.

The means can be configured to generate, using a speed planner, a longitudinal plan for an autonomous vehicle through the geographic area based on the altered nominal path. For example, the path alteration system can use a speed planner to determine a distance the autonomous vehicle is expected to travel during a given time period. A plan generation unit is one example of a means for generating, using a speed planner, a longitudinal plan for an autonomous vehicle through the geographic area based on the altered nominal path.

The means can be configured to generate a target velocity for one or more portions of the nominal path within the designated action region. For example, the path alteration system can determine a target speed that equals zero when the target zone includes a pick-up or drop-off location for an item or a passenger. A velocity planning unit is one example of a means for generating a target velocity for one or more portions of the nominal path within the designated action region.

The means can be configured to generate a trajectory for the autonomous vehicle based on the target velocity and the altered nominal path. For example, the path planning system can use the target velocity for one or more portions of the altered nominal path and the altered nominal path itself to generate a trajectory that follows the altered nominal path. A trajectory generation unit is one example of a means for generating a trajectory for the autonomous vehicle based on the target velocity and the altered nominal path.

The systems and methods described herein provide a number of technical effects and benefits. More particularly, the systems and methods of the present disclosure provide improved techniques for performing the path planning functions associated with an autonomous vehicle. Specifically, in a path planning system that generates longitudinal plans prior to identifying a final path, altering a nominal path as described above allows the path planning system to efficiently and safely react to events such as turning or performing pick-up/drop-off operations. As a result, the path planning system can more efficiently plan paths and select appropriate trajectories. This results in a reduction in the number of processing cycles necessary, reducing the amount of data storage needed, and reducing the amount of energy used by the system. Reducing energy consumption also increases the useful battery life of any battery systems included in the autonomous vehicle.

With reference to the figures, example embodiments of the present disclosure will be discussed in further detail.

FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 100 can be located onboard the vehicle 105 (e.g., it can be included on and/or within the vehicle 105).

The vehicle 105 incorporating the vehicle computing system 100 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a lightweight elective vehicle (e.g., bicycle, scooter, etc.). The vehicle 105 can be another type of vehicle (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for controlling an autonomous vehicle, communicating with other computing systems, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WIFI access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 130 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via different sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects within the surrounding environment of the vehicle 105 based at least in part on the sensor data from the sensors 135 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170C, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 170B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 170B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more waypoints (with associated coordinates). The planned vehicle motion trajectories can indicate the path the vehicle 105 is to follow as it traverses a route from one location to another. Thus, the vehicle computing system 110 can consider a route/route data when performing the motion planning function 170C.

The motion planning function 170C can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning function 170C can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and a corresponding planned vehicle motion trajectory. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 105. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back-passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of vehicle 105 can provide user input to adjust a destination location of vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190A (e.g., it's one or more processors, etc.) to perform operations and functions, such as those described herein matching users and vehicles/vehicle fleets, deploying vehicles, facilitating the provision of vehicle services via autonomous vehicles, etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 195 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 195. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Figure 2A:
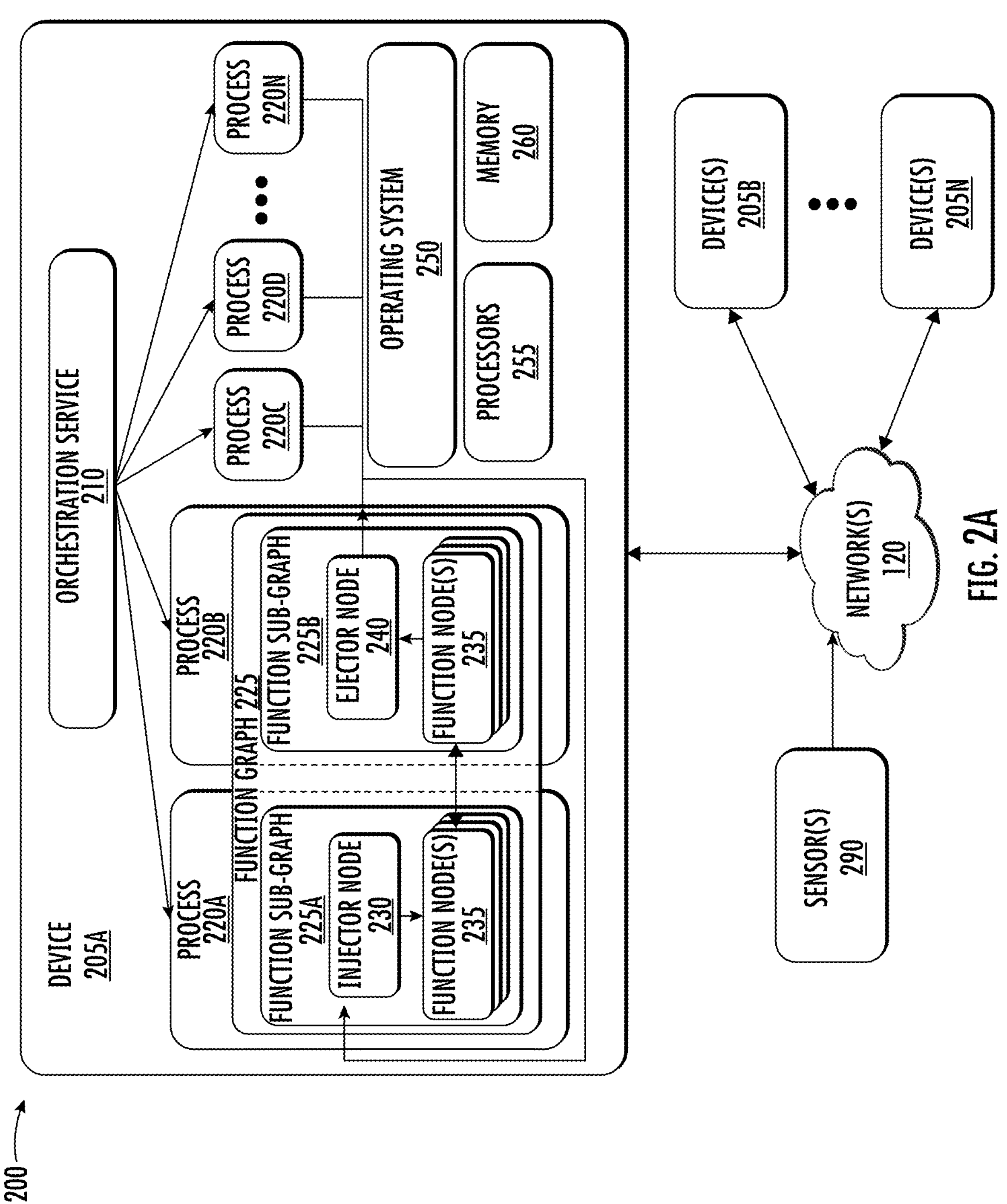
FIG. 2A depicts a diagram of an example system including a plurality of devices configured to execute one or more processes according to example implementations of the present disclosure.

FIG. 2A depicts a diagram of an example computing system 200 including one or more of the plurality of devices (e.g., plurality of devices 205A-N) of the computing system of the present disclosure. The plurality of devices 205A-N can include one or more devices configured to communicate over one or more wired and/or wireless communication channels (e.g., wired and/or wireless networks). Each device (e.g., 205A) can be associated with a type, an operating system 250, and/or one or more designated tasks. A type, for example, can include an indication of the one or more designated tasks of a respective device 205A. The one or more designated tasks, for example, can include performing one or more processes 220A-N and/or services of the computing system 200.

Each device 205A of the plurality of devices 205A-N can include and/or have access to one or more processors 255 and/or one or more memories 260 (e.g., RAM memory, ROM memory, cache memory, flash memory, etc.). The one or more memories 260 can include one or more tangible non-transitory computer readable instructions that, when executed by the one or more processors 255, cause the device 205A to perform one or more operations. The operations can include, for example, executing one or more of a plurality of processes of the computing system 200. For instance, each device 205A can include a compute node configured to run one or more processes 220A-N of the plurality of processes.

For example, the device 205A can include an orchestration service 210. The orchestration service 210 can include a start-up process of the device 205A. The orchestration service 210, for example, can include an operating system service (e.g., a service running as part of the operating system 250). In addition, or alternatively, the orchestration service can include a gRPC service. The device 205A can run the orchestration service 210 to configure and start processes 220A-220N of the device 205A. In some implementations, the orchestration service 210 can include a primary orchestrator and/or at least one of a plurality of secondary orchestrators. For example, each respective device of the plurality of devices can include at least one of the plurality of secondary orchestrators. The primary orchestrator can be configured to receive global configuration data and provide the global configuration data to the plurality of secondary orchestrators. The global configuration data, for example, can include one or more instructions indicative of the one or more designated tasks for each respective device(s) 205A-N, a software version and/or environment on which to run a plurality of processes (e.g., 220A-220N of the device 205A) of the computing system 200, etc. A secondary orchestrator for each respective device can receive the global configuration data and configure and start one or more processes at the respective device based on the global configuration data.

For instance, each process (e.g., process 220A, 220B) can include a plurality of function nodes 235 (e.g., pure functions) connected by one or more directed edges that dictate the flow of data between the plurality of function nodes 235. Each device 205A can execute (e.g., via one or more processors, etc.) a respective plurality of function nodes 235 to run a respective process 220A, 220B. For example, the plurality of function nodes 235 can be arranged in one or more function graphs 225. A function graph 225 can include a plurality of (e.g., series of) function nodes 235 arranged (e.g., by one or more directed edges) in a pipeline, graph architecture, etc.

Figure 2B:
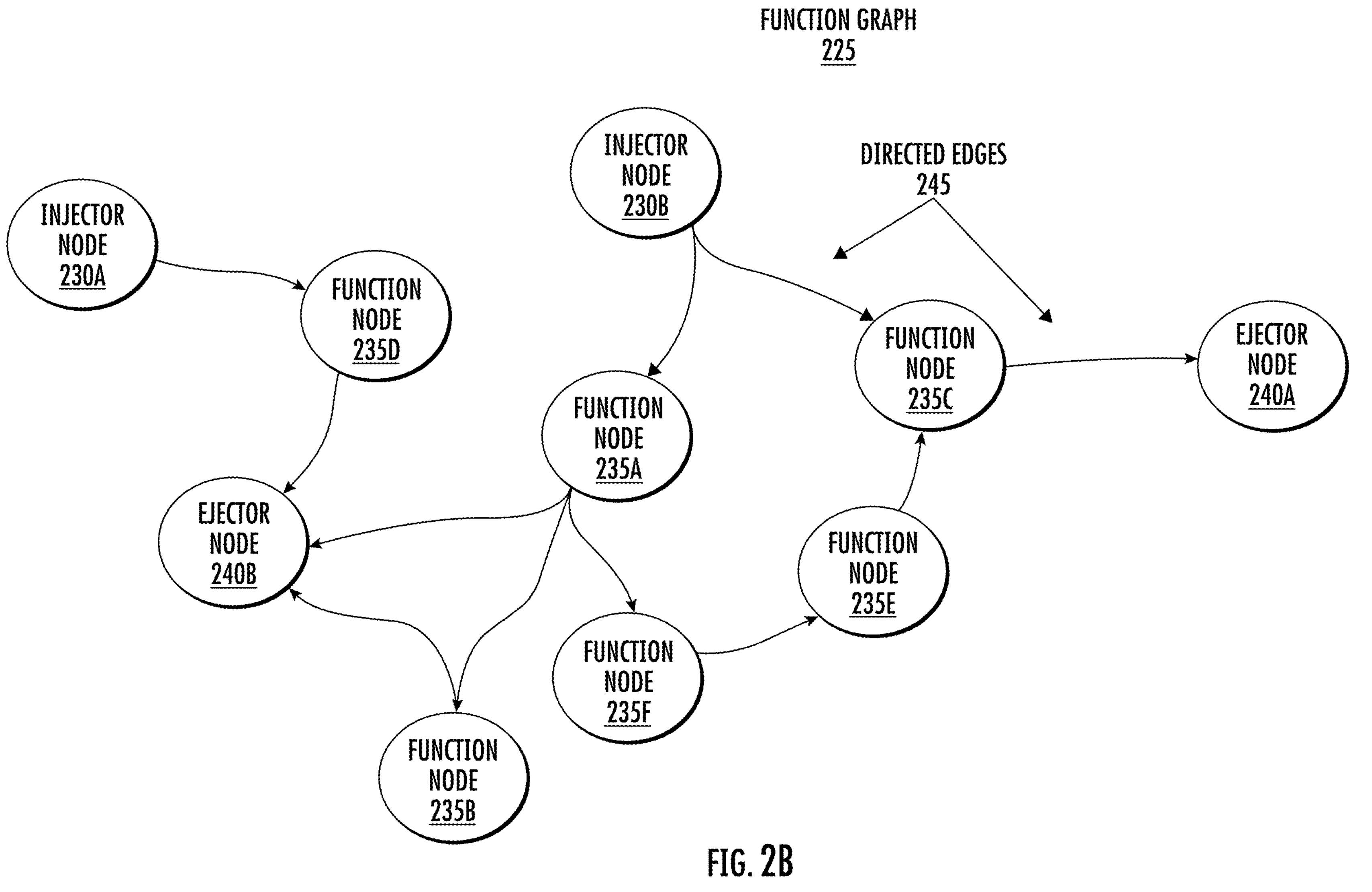
FIG. 2B depicts a diagram of an example functional graph according to example implementations of the present disclosure.

For example, with reference to FIG. 2B, FIG. 2B depicts a diagram of an example functional graph 225 according to example implementations of the present disclosure. The function graph 225 can include a plurality of function nodes 235A-F, one or more injector nodes 230A-B, one or more ejector nodes 240A-B, and/or one or more directed edges 245. The function nodes 235 can include one or more computing functions with one or more inputs (e.g., of one or more data types) and one or more outputs (e.g., of one or more data types). For example, the function nodes 235A-F can be implemented such that they define one or more accepted inputs and one or more outputs. In some implementations, each function node 235A-F can be configured to obtain one or more inputs of a single data type, perform one or more functions on the one or more inputs, and output one or more outputs of a single data type.

Each function node of the plurality of function nodes 235A-F can be arranged in a directed graph architecture (e.g., including a plurality of function graphs) and can be configured to obtain function input data associated with an autonomous vehicle based on the one or more directed edges 245 (e.g., of the directed graph 225). For instance, the function nodes 235A-F can be connected by one or more directed edges 245 of the function graph 225 (and/or a subgraph 225A, 225B of the function graph 225 with reference to FIG. 2A). The one or more directed edges 245 can dictate how data flows through the function graph 225 (and/or the subgraphs 225A, 225B of FIG. 2A). For example, the one or more directed edges 245 can be formed based on the defined inputs and outputs of each of the function nodes 235A-F of the function graph 225. The function nodes 235A-F can generate function output data based on the function input data. For instance, the function nodes 235A-F can perform one or more functions of the autonomous vehicle on the function input data to obtain the function output data. The function nodes 235A-F can communicate the function output data to one or more other function nodes of the plurality of function nodes 235A-F based on the one or more directed edges 245 of the directed graph 225.

In addition, or alternatively, each function graph 225 can include one or more injector nodes 230A-B and one or more ejector nodes 220A-B configured to communicate with one or more remote devices and/or processes (e.g., processes 220C-220N of FIG. 2A) outside the function graph 225. The injector nodes 230A-B, for example, can be configured to communicate with one or more devices and/or processes (e.g., processes 220C-220N of FIG. 2A) outside the function graph 225 to obtain input data for the function graph 225. By way of example, each of the one or more injector nodes 230A-B can include a function configured to obtain and/or process sensor data from a respective sensor 280 shown in FIG. 2A (e.g., sensor(s) 135 of FIG. 1). The ejector nodes 240A-B can be configured to communicate with one or more devices 205B-N and/or processes 220C-220N outside the function graph 225 to provide function output data of the function graph 225 to the one or more devices 205B-N and/or processes 220C-220N.

Turning back to FIG. 2A, each device 205A-N can be configured to execute one or more function graphs 225 to run one or more processes 220A, 220B of the plurality of processes 220A-N of the respective device 205A. For example, as described herein, each respective device can be configured to run a respective set of processes based on global configuration data. Each process 220A-N can include an executed instance of a function graph and/or a subgraph of a function graph. For example, in some implementations, a function graph 225 can be separated across multiple processes 220A, 220B. Each process 220A, 220B can include a subgraph 225A, 225B (e.g., process 220A including subgraph 225A, process 220B including subgraph 225B, etc.) of the function graph 225. In such a case, each process 220A, 220B of the function graph 225 can be communicatively connected by one or more function nodes 235 of the function graph 225. In this manner, each respective device 205A-N can be configured to run a respective process by executing a respective function graph and/or a subgraph of the respective function graph. Thus, each function graph can be implemented as a single process or multiple processes. For instance, the messages communicated between nodes of a sub-graph dedicated to motion planning for an autonomous vehicle can help identify a nominal path for the vehicle given the area/environment in which the vehicle is operating, motion constraints, costs, vehicle trajectories, etc.

In some implementations, one or more of the plurality of processes 220A-N can include containerized services (application containers, etc.). For instance, each process 220A-N can be implemented as a container (e.g., docker containers, etc.). For example, the plurality of processes 220A-N can include one or more containerized processes abstracted away from an operating system 250 associated with each respective device 205A. As an example, the containerized processes can be run in docker containers, such that each process is run and authorized in isolation. For example, each respective container can include one or more designated computing resources (e.g., processing power, memory locations, etc.) devoted to processes configured to run within the respective container. Moreover, in some implementations, each container can include an isolated runtime configuration (e.g., software model, etc.). In this manner, each container can independently run processes within a container specific runtime environment.

The plurality of devices 205A-N, sensors 280, processes 220A-N, etc. of the computing system 200 (e.g., the plurality of processes of the vehicle computing system 110, a plurality of processes of the one or more remote devices, etc.) can be communicatively connected over one or more wireless and/or wired networks 120. For instance, the plurality of devices 205A-N (and/or processes 220A-N of device 205A) can communicate over one or more communication channels 120. Each device and/or process can exchange messages over the one or more communicative channels using a message interchange format (e.g., JSON, IDL, etc.). By way of example, a respective process can utilize one or more communication protocols (e.g., HTTP, REST, gRPC, etc.) to provide and/or receive messages from one or more respective device processes (e.g., other processes running on the same device) and/or remote processes (e.g., processes running on one or more other devices of the computing system). In this manner, devices can be configured to communicate messages between one or more devices, services, and/or other processes to carry out one or more tasks. The messages, for example, can include function output data associated with a respective function node (e.g., 235).

Figure 2C:
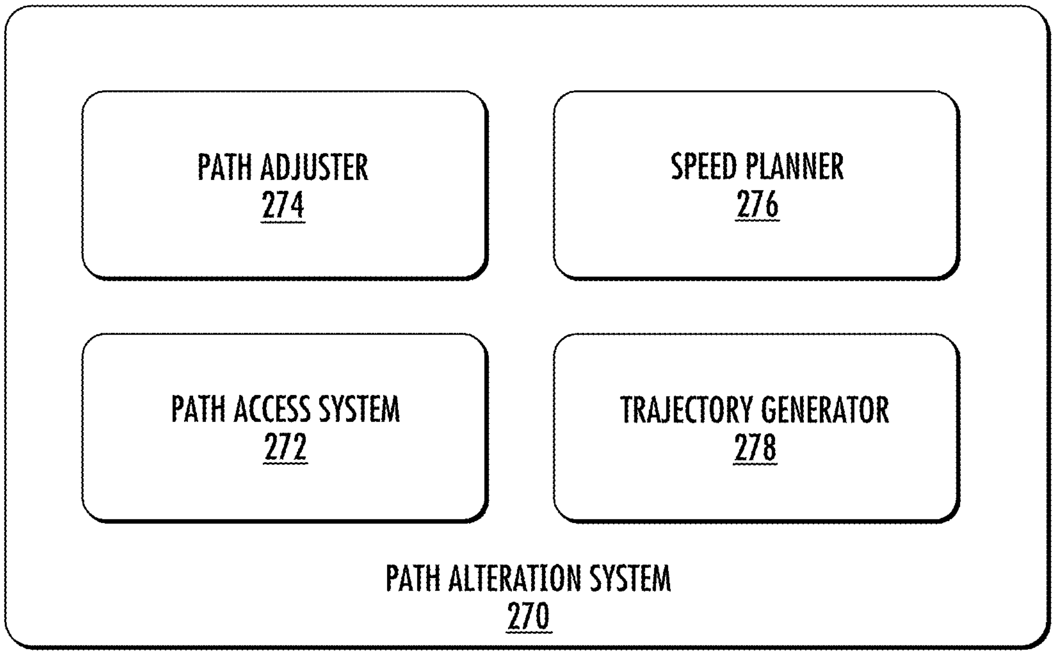
FIG. 2C depicts a block diagram of an example path alteration system according to example embodiments of the present disclosure.

FIG. 2C depicts a block diagram of an example path alteration system 270 according to example embodiments of the present disclosure. The path alteration system 270 of the autonomous vehicle (e.g., autonomous vehicle 105 in FIG. 1) can alter a nominal path for the autonomous vehicle (e.g., autonomous vehicle 105 in FIG. 1) when a specific target zone is specified. To help accomplish this, the path alteration system 270 can include a plurality of components or modules including, but not limited to: a path access system 272, a path adjuster 274, a speed planner 276, and a trajectory generator 278.

A path access system 272 can access nominal path data for the autonomous vehicle (e.g., autonomous vehicle 105 in FIG. 1) based on a planned route. In some examples, the path access system 272 can identify a nominal path for the autonomous vehicle (e.g., autonomous vehicle 105 in FIG. 1) going forward (and/or in reverse). The nominal path can represent a preferred path through a particular environment without accounting for obstacles that may exist. In some examples, the nominal path does account for permanent or semi-permanent obstacles but does not account for potential moving obstacles. In some examples, the nominal path includes a series of points, each point being represented by a set of coordinates for the location of the autonomous vehicle (e.g., autonomous vehicle 105 in FIG. 1) at a particular point in time along the nominal path (e.g., 1 second, 2 seconds, 3 seconds, and so on). Thus, each point can represent a subsequent step in a time series along that nominal path such that the nominal path is represented by connecting each of the points.

The path access system 272 can receive instructions designating a particular area as the target zone. As discussed above, the target zone can be associated with a particular activity, such as, for example, picking up or dropping off a passenger or item, or with making a turn. Once the target zone has been established, a path adjuster 274 can alter the nominal path laterally such that it passes through the target zone. In some examples, laterally altering the nominal path can include, for a plurality of points in the nominal path, identifying the distance from the current point to the target zone and laterally shifting the point such that it is positioned inside of the target zone.

In some examples, a point in the nominal path can be laterally shifted to the center of the target zone. In other examples, the points can be shifted such that the nominal path moves in a way that does not exceed comfortable acceleration or turning limits. For example, if the target zone is an area on the shoulder of the road outside of the normal driving lanes, the path adjuster 274 can first move one or more points of the nominal path laterally into the target zone. Once this has been accomplished, the path adjuster 274 can determine whether the acceleration and changes in heading that result from the lateral adjustment exceed one or more threshold values for velocity, acceleration, or jerk. If the determined acceleration and changes in heading result in values for velocity, acceleration, or jerk that exceed threshold values, the path adjuster 274 can laterally alter points before and after the target zone to ensure that the autonomous vehicle can move into the target zone without exceeding the predetermined threshold limit values.

In some examples, the path adjuster 274 can alter one or more features of the map data or other data representing the current environment around the autonomous vehicle (e.g., autonomous vehicle 105 in FIG. 1). The current environment around the autonomous vehicle (e.g., autonomous vehicle 105 in FIG. 1) can include the geographic area around the autonomous vehicle (e.g., autonomous vehicle 105 in FIG. 1) that is visible (e.g., within sensor range/field of view of a camera, a LIDAR sensor, a RADAR sensor, and so on) to the sensors included in the autonomous vehicle (e.g., autonomous vehicle 105 in FIG. 1). Additionally or alternatively, the current environment around the autonomous vehicle (e.g., autonomous vehicle 105 in FIG. 1) can include the geographic area within a predetermined distance of the nominal path (e.g., 100 meters from the path).

In one example, the path adjuster 274 can alter the autonomous vehicle's (e.g., autonomous vehicle 105 in FIG. 1) internal representation of the lane boundaries associated with the current lane of travel of the autonomous vehicle (e.g., autonomous vehicle 105 in FIG. 1). In this way, when candidate trajectories are evaluated, the trajectories will not be assigned a high cost for crossing a lane boundary. When a turn is requested, the data representing the lane boundary can be altered such that the lane boundary appears to be shifted such that the autonomous vehicle (e.g., autonomous vehicle 105 in FIG. 1) can move to the side of the road in preparation for the turn. Thus shifting of the lane boundary can include, for example, altering the representation of the lane boundary stored onboard the autonomous vehicle (e.g., autonomous vehicle 105 in FIG. 1) based on the map data, the perception data, etc.

The path adjuster 274 can designate a portion of the nominal path as an action region or a region associated with a special action (e.g., picking-up or dropping-off a passenger or item or making a turn, etc.). The designated action region can be the portion of the nominal path in which the special action is to be performed. The designated action region can be assigned to one or more points in the nominal path. A first point can be designated as the starting point of the designated action region and a second point can be designated as the ending point of the designated action region and all points in between the first point and the second point can be included in the special action region.

Once the nominal path has been altered, the speed planner 276 included in the path alteration system 270 can generate a longitudinal plan for the autonomous vehicle. The longitudinal plan can follow the altered nominal path and can represent the longitudinal distance the autonomous vehicle (e.g., autonomous vehicle 105 in FIG. 1) is expected to travel during a particular period of time (e.g., eight seconds). For example, the longitudinal plan can indicate that the autonomous vehicle (e.g., autonomous vehicle 105 in FIG. 1) is to travel two-hundred ninety-six feet in an eight second time period in the forward direction of travel associated with a particular roadway.

Once the longitudinal plan has been generated, the speed planner 276 can generate one or more speed targets for one or more points in the special action region. The speed targets can include a planned velocity, a target pose, and a target heading.

A planned velocity can be a velocity that the speed planner 276 determines that the autonomous vehicle (e.g., autonomous vehicle 105 in FIG. 1) needs to have at a particular point in time and/or in distance. Thus, if a speed planner 276 determines that that autonomous vehicle (e.g., autonomous vehicle 105 in FIG. 1) needs to come to a stop within five seconds, the speed planner 276 can generate target velocities for the autonomous vehicle (e.g., autonomous vehicle 105 in FIG. 1) that represent the autonomous vehicle (e.g., autonomous vehicle 105 in FIG. 1) slowing at each time interval before that time such that it can safely come to a stop as desired. For example, if the autonomous vehicle (e.g., autonomous vehicle 105 in FIG. 1) starts at 25 m/s, the speed planner 276 can generate a plan in which the planned velocity for the autonomous vehicle (e.g., autonomous vehicle 105 in FIG. 1) is reduced by 5 m/s for each second of the next five seconds. Similarly, the target pose can represent the position and orientation that the autonomous vehicle (e.g., autonomous vehicle 105 in FIG. 1) should have at a particular point in time to meet the planned velocity goals. The target heading for an autonomous vehicle (e.g., autonomous vehicle 105 in FIG. 1) at a particular time can be based on the intended future path of the autonomous vehicle (e.g., autonomous vehicle 105 in FIG. 1), so that some controls such as the direction of the steering wheel or tire direction can be in the appropriate state to travel the intended future path.

A trajectory generator 278 can generate one or more potential trajectories. The trajectories can include, among other things, one or more heading values and one or more acceleration values. To do so, the trajectory generator 278 can access the altered nominal path, the target velocities, poses, and headings. Using this information, the trajectory generator 278 can generate one or more candidate trajectories, each representing a potential variation of movement from the current position, through one or more intermediate points, to a target position. A trajectory can be translated and provided to the vehicle control system(s) (e.g., via a vehicle interface/controller) that can generate specific control signals for the autonomous vehicle (e.g., autonomous vehicle 105 in FIG. 1) (e.g., alter steering, braking, velocity, and so on).

Figure 3A:
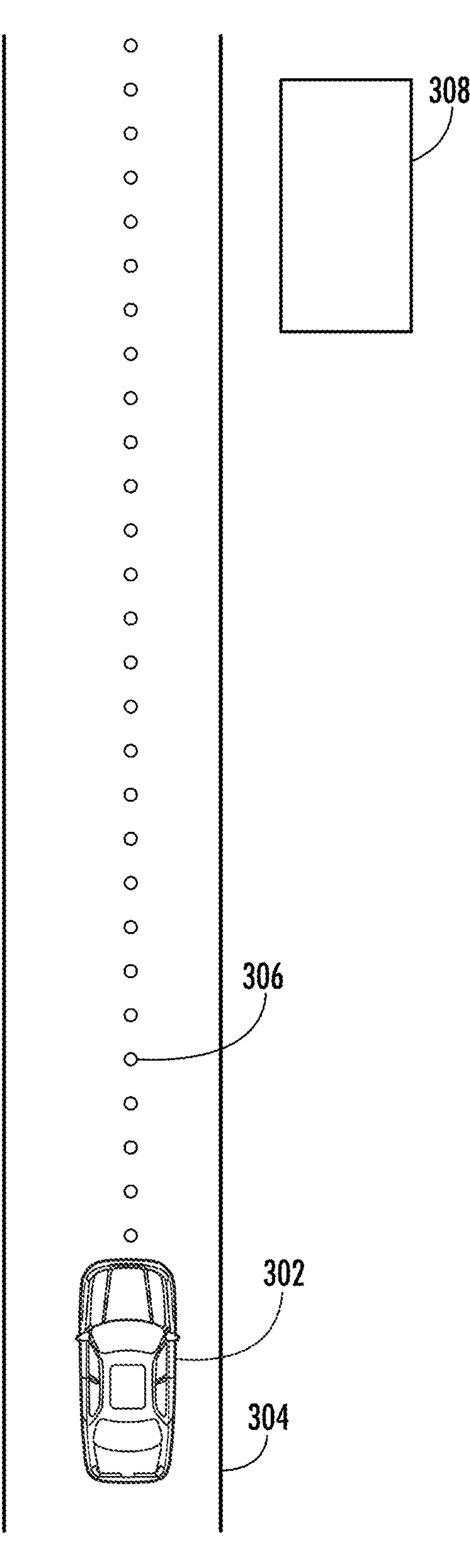
FIGS. 3A-3D depict examples of a nominal path alteration according to example embodiments of the present disclosure.

FIG. 3A depicts an example of a nominal path alteration according to example embodiments of the present disclosure. In this example, an environment 300 can include an autonomous vehicle 302, a path defined by one or more lane boundaries 304, and a target zone 308. In this example, the autonomous vehicle 302 is travelling along a nominal path 306. The nominal path 306 can include a plurality of target coordinates for the autonomous vehicle 302 for a series of time steps. The autonomous vehicle 302 can receive the location of a target zone 308 that is associated with a turn or a pick-up location or a drop-off location.

Figure 3B:
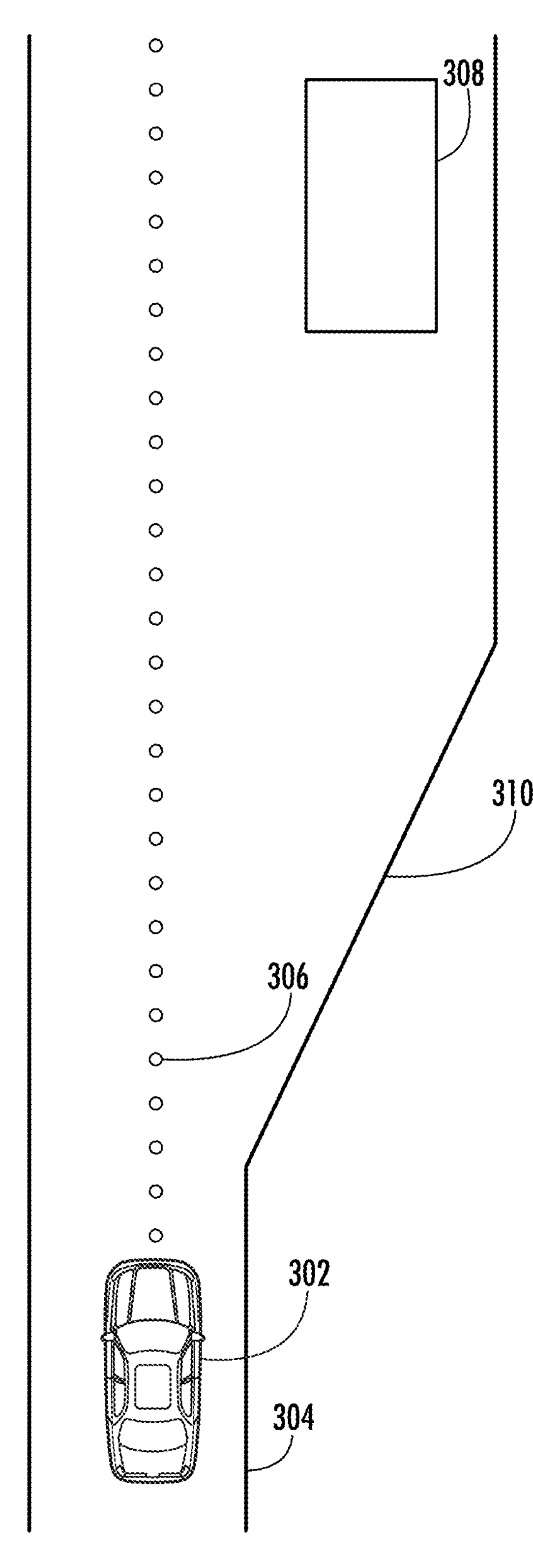

FIG. 3B depicts an example of a nominal path alteration according to example embodiments of the present disclosure. As described above with respect to FIG. 3A, the environment 300 includes an autonomous vehicle 302, one or more lane boundaries 304, a nominal path 306, and a target zone 308. In response to receiving information describing a target zone, the vehicle computing system (e.g., vehicle computing system 110 in FIG. 1) included in autonomous vehicle 302 can alter an internal representation of the lane boundary 304 (e.g., by shifting the coordinates/data points stored in a map data structure, etc.) such that the target zone 308 is within the internal representation of the altered lane boundary 310.

Figure 3C:
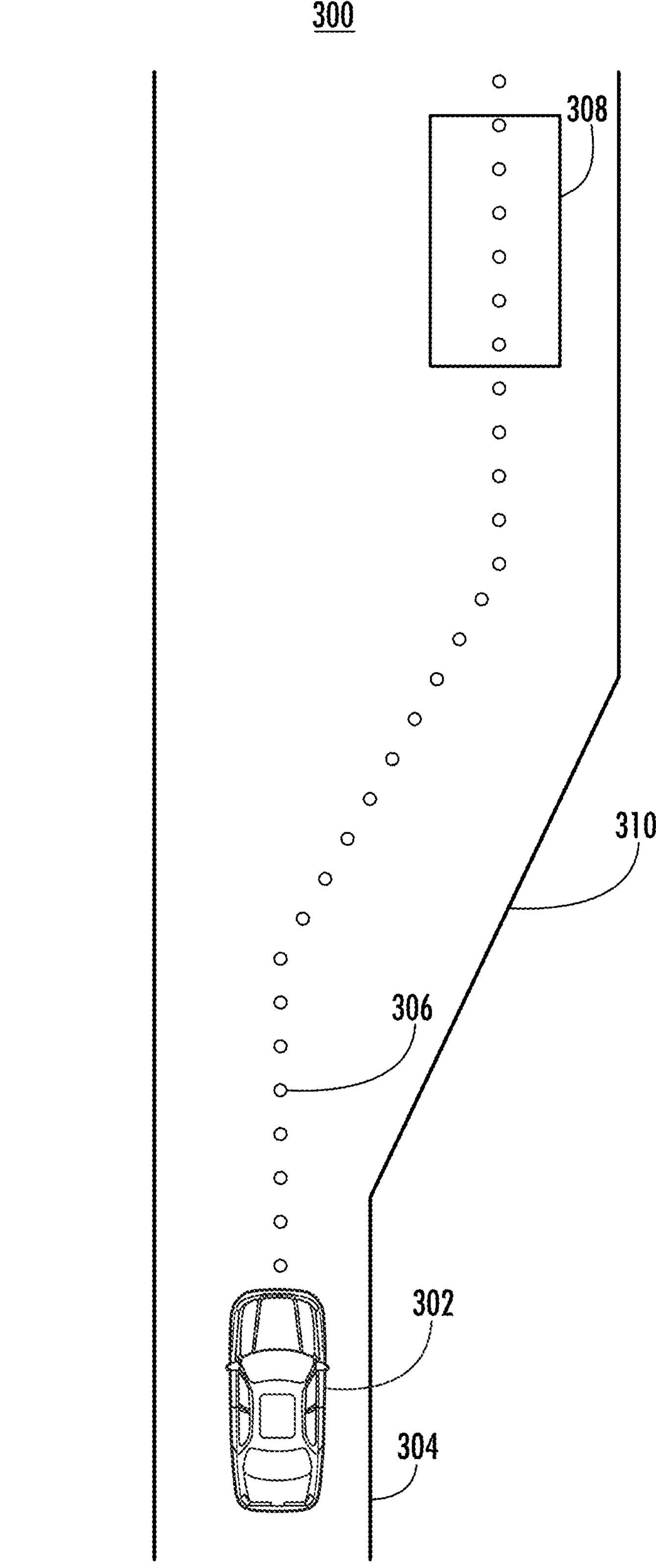

FIG. 3C depicts an example of a nominal path alteration according to example embodiments of the present disclosure. As described above with respect to FIGS. 3A and 3B, the environment 300 includes an autonomous vehicle 302, one or more lane boundaries 304, a nominal path 306, and a target zone 308. Once the representation of the lane boundaries 304 have been adjusted such that the target zone 308 is within the lane boundaries, the vehicle computing system (e.g., vehicle computing system 110 in FIG. 1) can adjust the nominal path 306 such that it passes through the target zone 308. The vehicle computing system (e.g., vehicle computing system 110 in FIG. 1) can determine, from a plurality of coordinates along the nominal path 306, a first coordinate 320 within the target zone 308 and a last coordinate 322 within the target zone 308.

Figure 3D:
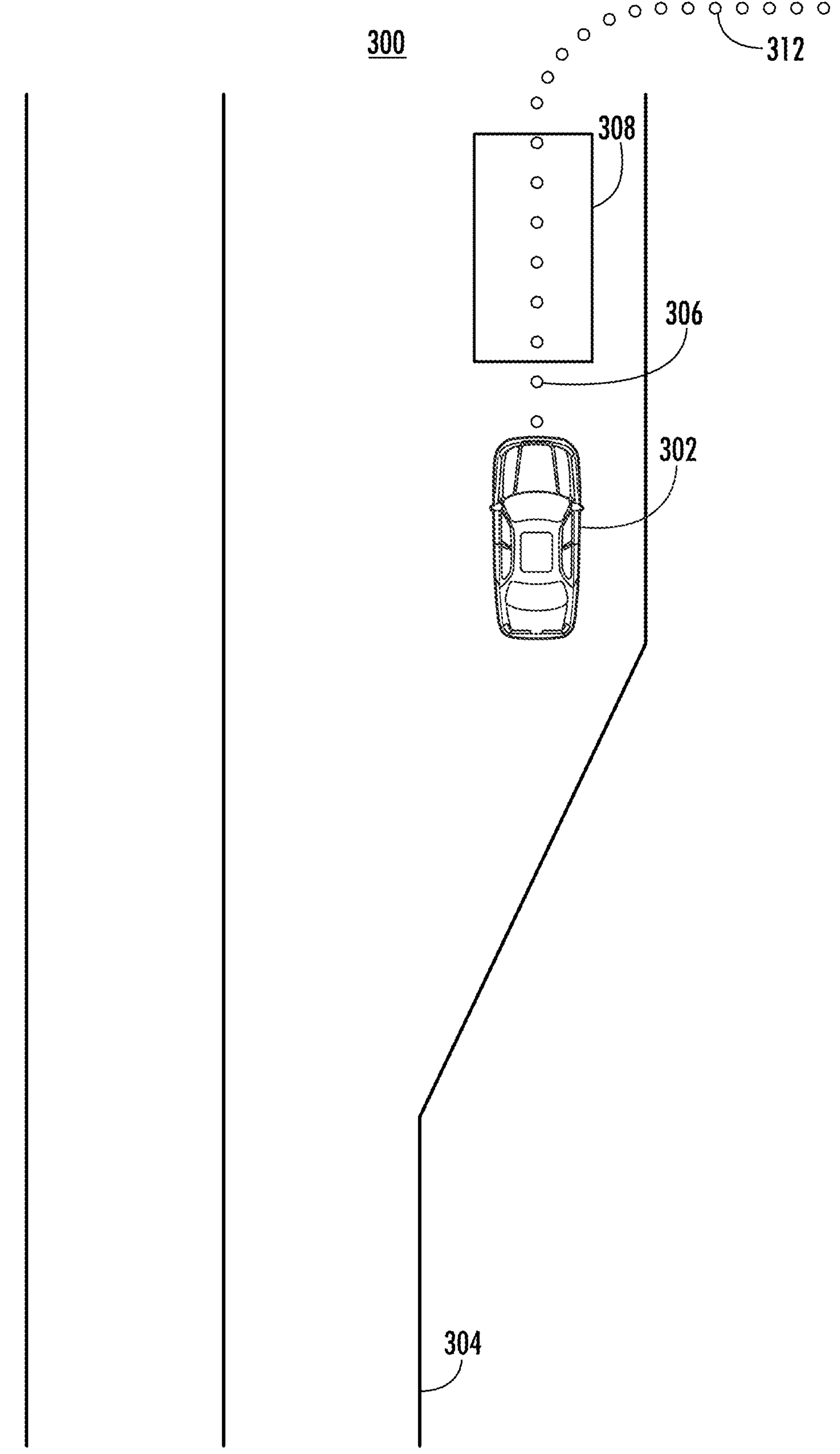

FIG. 3D depicts an example of a nominal path alteration according to example embodiments of the present disclosure. As described above with respect to FIGS. 3A-3C, the environment 300 includes an autonomous vehicle 302, one or more lane boundaries 304, a nominal path 306, and a target zone 308. In this example, the target zone 308 is associated with a turn. Thus, the nominal path 306 can be altered to turn onto another lane 312, travel way, etc. after the target zone 308.

Figure 4:
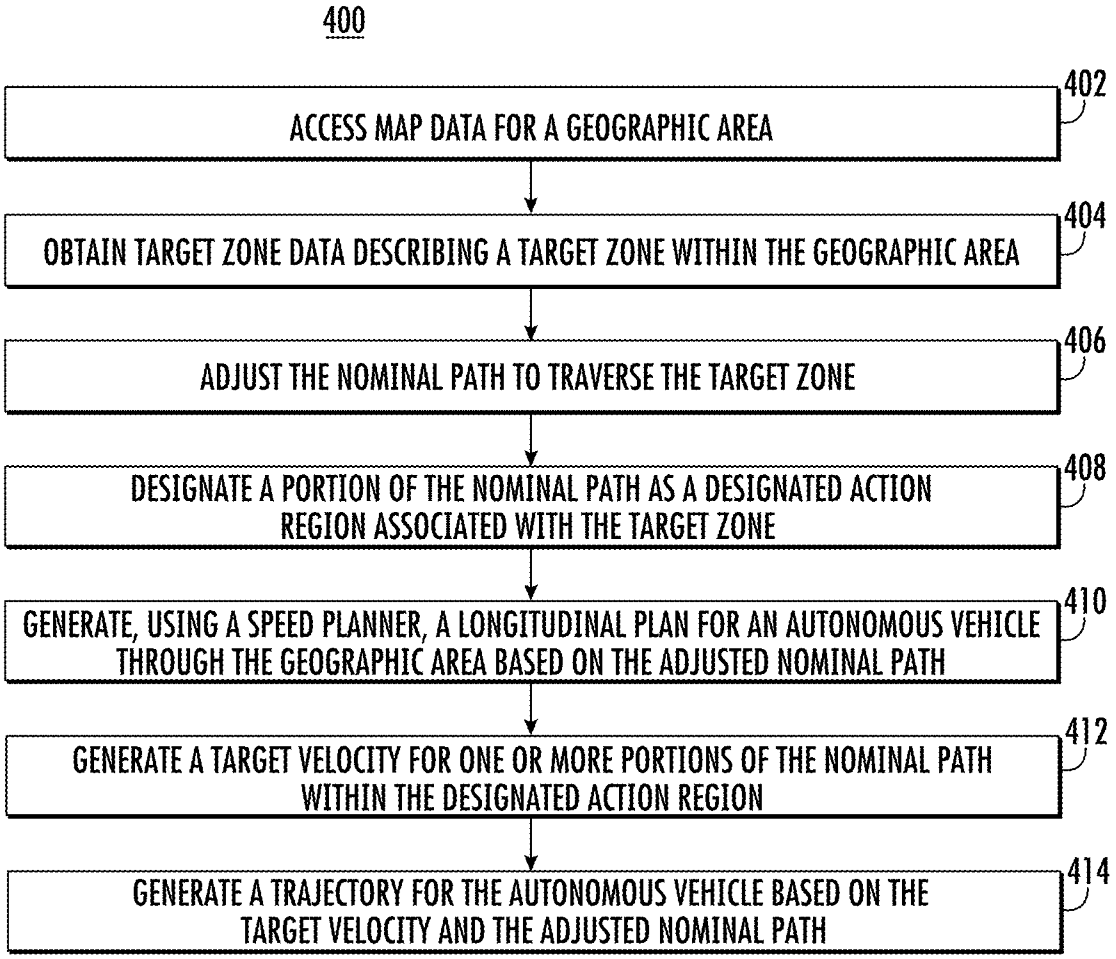
FIG. 4 depicts a flow chart diagram of an example method according to example embodiments of the present disclosure.

FIG. 4 depicts a flow chart diagram of an example method according to example embodiments of the present disclosure. One or more portions of method 400 can be implemented by one or more computing devices such as, for example, a computing device of an autonomous vehicle (e.g., autonomous vehicle 105) as depicted in FIG. 1. One or more portions of the method 400 described herein can be implemented as an algorithm on the hardware components of the devices described herein (e.g., as in FIG. 1 and FIG. 2C) to, for example, generate motion plans for an autonomous vehicle (e.g., autonomous vehicle 105 in FIG. 1). Although FIG. 4 depicts steps performed in a particular order for purposes of illustration and discussion, method 400 of FIG. 4 is not limited to the particularly illustrated order or arrangement. The various steps of the methods disclosed herein can be omitted, rearranged, combined, and/or adapted in various ways without deviating from the scope of the present disclosure.

An autonomous vehicle (e.g., autonomous vehicle 105 in FIG. 1) can include a vehicle computing system (e.g., vehicle computing system 110 in FIG. 1). The vehicle computing system (e.g., vehicle computing system 110 in FIG. 1) can, at 402, access map data for a geographic area. The map data can include data associated with a nominal path. In some examples, the nominal path includes a series of geographic coordinates associated with a series of time steps. In some examples, each geographic coordinate can include an associated position and pose for the autonomous vehicle (e.g., autonomous vehicle 105 in FIG. 1).

The vehicle computing system (e.g., vehicle computing system 110 in FIG. 1) can obtain, at 404, target zone data describing a target zone within the geographic area. In some examples, the target zone can be a zone associated with picking up or dropping off a passenger or item. In some examples, the target zone can be identified based on data provided by a remote computing system. For instance, an operations computing system associated with a service entity (e.g., offering/coordinating vehicle services, etc.) can provide data associated with a service request and/or a route for the autonomous vehicle (e.g., autonomous vehicle 105 in FIG. 1). The data can include a target zone that is designated for picking-up or dropping-off a passenger and/or item. In some examples, the vehicle computing system (e.g., vehicle computing system 110 in FIG. 1) can select a target zone. For example, the vehicle computing system (e.g., vehicle computing system 110 in FIG. 1) can obtain data indicative of a geographic location associated with a pick-up event or a drop off event (e.g., a curbside waiting area adjacent to an address associated with a user).

The vehicle computing system (e.g., vehicle computing system 110 in FIG. 1) can select, based on the map data, the target zone to include the geographic location associated with the pick-up event or the drop off event. This can include, for example, an area along a curb and/or road shoulder where the autonomous vehicle (e.g., autonomous vehicle 105 in FIG. 1) can pull over to pick-up a user and where the autonomous vehicle (e.g., autonomous vehicle 105 in FIG. 1) may straddle a lane boundary while in the target zone. The vehicle computing system (e.g., vehicle computing system 110 in FIG. 1) can, at 406, adjust the nominal path to create an altered nominal path that traverses the target zone.

The vehicle computing system (e.g., vehicle computing system 110 in FIG. 1) can designate, at 408, a portion of the altered nominal path as a designated action region associated with the target zone. To do so, the vehicle computing system (e.g., vehicle computing system 110 in FIG. 1) can identify a first coordinate (e.g., first coordinate 320 in FIG. 3C) in the series of geographic coordinates that fall within the target zone. The vehicle computing system (e.g., vehicle computing system 110 in FIG. 1) can identify a last coordinate (e.g., last coordinate 322 in FIG. 3C) in the series of geographic coordinates that fall within the target zone. The vehicle computing system (e.g., vehicle computing system 110 in FIG. 1) can designate the first coordinate, the last coordinate, and any coordinates between the first and last coordinates in the series of coordinates as being included in the designated action region.

In some examples, the designated action region can be a zone associated with a vehicle action associated with the autonomous vehicle (e.g., autonomous vehicle 105 in FIG. 1). The vehicle action can include, for example, a turn. In some examples, the turn can be a right turn, a left turn, or a U-turn. The vehicle computing system (e.g., vehicle computing system 110 in FIG. 1) can set a target velocity for at least one portion of the nominal path within the designated action region (e.g., the section of the nominal path that has been designed as being within the target zone) to the preferred turning velocity.

The vehicle computing system (e.g., autonomous vehicle 105 in FIG. 1) can determine an altered nominal path to traverse the target zone. To do so, the vehicle computing system (e.g., vehicle computing system 110 in FIG. 1) can determine, based on data representing the position of one or more lane boundaries included in the map data, whether the target zone is at least partially outside the one or more lane boundaries included in the map data. In accordance with a determination that the target zone is at least partially outside the one or more boundaries lanes included in the map data, the vehicle computing system (e.g., vehicle computing system 110 in FIG. 1) can alter the data representing the position of one or more lane boundaries such that the entire target zone is within a space designated by the altered data representing the one or more lane boundaries.

The vehicle computing system (e.g., vehicle computing system 110 in FIG. 1) can laterally alter a plurality of coordinates in the designated action region such that the altered nominal path traverses the target zone. The vehicle computing system (e.g., vehicle computing system 110 in FIG. 1) can determine whether the altered nominal path meets one or more smoothness requirements. The one or more smoothness requirements can represent a determination that the altered nominal path, when travelled by the autonomous vehicle, does not exceed one or more predetermined threshold values for acceleration, turning rate, velocity, and jerk.

In accordance with a determination that the altered nominal path does not meet the one or more smoothness requirements, the vehicle computing system (e.g., vehicle computing system 110 in FIG. 1) can laterally alter one or more coordinates outside the designated action region such that the nominal path meets the one or more smoothness requirements. In some examples, the smoothness requirements can be associated with bounded limits on one or more derivatives of polynomials associated with the nominal path. For example, a polynomial can be determined to be associated with or otherwise represent the nominal path (or a given trajectory based on the nominal path). One or more derivatives can be calculated based on this polynomial (e.g., a 3rd, 4th, or 5th order derivative). These derivatives can be evaluated to ensure that they do not exceed predetermined limits on velocity, acceleration, or jerk.

The vehicle computing system (e.g., vehicle computing system 110 in FIG. 1) can generate, at 410, a longitudinal plan for an autonomous vehicle through the geographic area based on the altered nominal path. The vehicle computing system (e.g., vehicle computing system 110 in FIG. 1) can generate, at 412, a target velocity for one or more portions of the nominal path within the designated action region. The vehicle computing system (e.g., vehicle computing system 110 in FIG. 1) can, for at least one portion of the nominal path, set the target velocity to zero (e.g., in the event that the autonomous vehicle (e.g., autonomous vehicle 105 in FIG. 1) is stopping in the target zone to pick-up a passenger/item).

The vehicle computing system (e.g., vehicle computing system 110 in FIG. 1) can generate, at 414, a trajectory for the autonomous vehicle based on the target velocity and the altered nominal path. The vehicle computing system (e.g., vehicle computing system 110 in FIG. 1) can generate data to maintain the velocity of the autonomous vehicle (e.g., autonomous vehicle 105 in FIG. 1) at zero until after the pick-up event or the drop off event has occurred. In some examples, the trajectory is generated based at least in part on the longitudinal plan and the target velocities.

Figure 5:
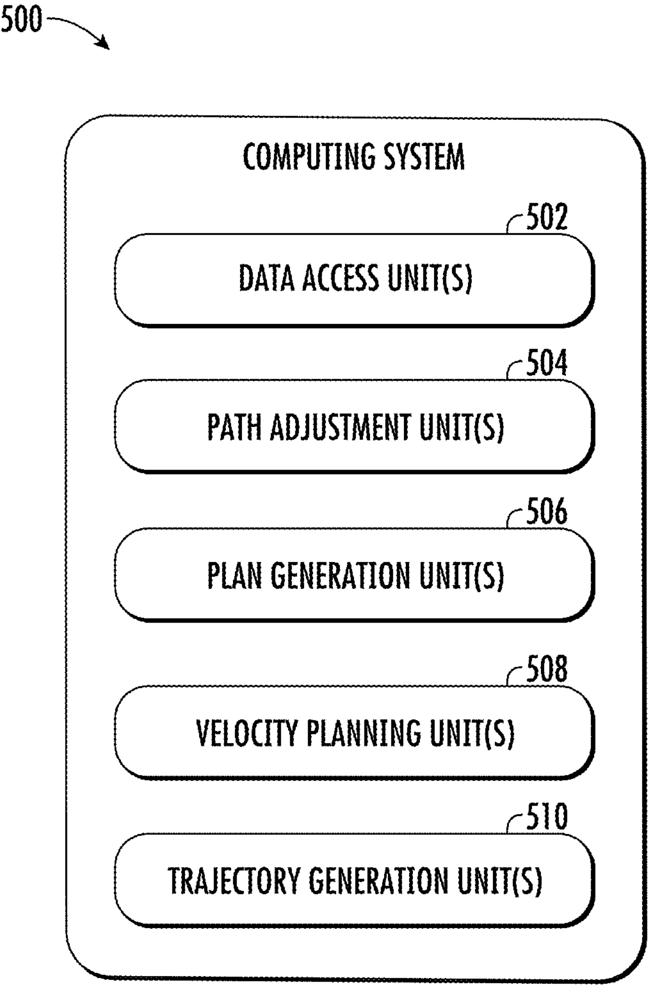
FIG. 5 depicts an example system with units for performing operations and functions according to example aspects of the present disclosure.

FIG. 5 depicts an example system with units for performing operations and functions according to example aspects of the present disclosure. Various means can be configured to perform the methods and processes described herein. For example, a computing system can include data access unit(s) 502, path adjustment unit(s) 504, plan generation unit(s) 506, velocity planning unit(s) 508, trajectory generation unit(s) 510, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to access map data for a geographic area (the map data being associated with a nominal path) and obtaining target zone data describing a target zone within the geographic area. For example, a vehicle computing system (e.g., vehicle computing system 110 in FIG. 1) can access map data from a map database that includes a nominal path and target zone data from a remote server system. A data access unit 502 is one example of a means for accessing map data for a geographic area (the map data being associated with a nominal path) and obtaining target zone data describing a target zone within the geographic area.

The means can be configured to determine an altered nominal path to traverse the target zone and designate a portion of the altered nominal path as a designated action region associated with the target zone. For example, the vehicle computing system (e.g., vehicle computing system 110 in FIG. 1) can alter the nominal path such that it passes through the target zone. A portion of the target zone can then be designated as an action region. A path adjustment unit 504 is one example of a means for determining an altered nominal path to traverse the target zone and designating a portion of the altered nominal path as a designated action region associated with the target zone.

The means can be configured to generate, using a speed planner (e.g., speed planner 276 in FIG. 2C), a longitudinal plan for an autonomous vehicle (e.g., autonomous vehicle 105 in FIG. 1) through the geographic area based on the altered nominal path. For example, the vehicle computing system (e.g., vehicle computing system 110 in FIG. 1) can use a speed planner (e.g., speed planner 276 in FIG. 2C) to determine a distance the autonomous vehicle is expected to travel during a given time period. A plan generation unit 506 is one example of a means for generating, using a speed planner, a longitudinal plan for an autonomous vehicle through the geographic area based on the altered nominal path.

The means can be configured to generate a target velocity for one or more portions of the nominal path within the designated action region. For example, the vehicle computing system (e.g., vehicle computing system 110 in FIG. 1) can determine a target speed that equals zero when the target zone includes a pick-up or drop-off location for an item or a passenger. A velocity planning unit 508 is one example of a means for generating a target velocity for one or more portions of the nominal path within the designated action region.

The means can be configured to generate a trajectory for the autonomous vehicle (e.g., autonomous vehicle 105 in FIG. 1) based on the target velocity and the altered nominal path. For example, the vehicle computing system (e.g., vehicle computing system 110 in FIG. 1) can use the target velocity for one or more portions of the altered nominal path and the altered nominal path itself to generate a trajectory that follows the altered nominal path. A trajectory generation unit 510 is one example of a means for generating a trajectory for the autonomous vehicle (e.g., autonomous vehicle 105 in FIG. 1) based on the target velocity and the altered nominal path.

Figure 6:
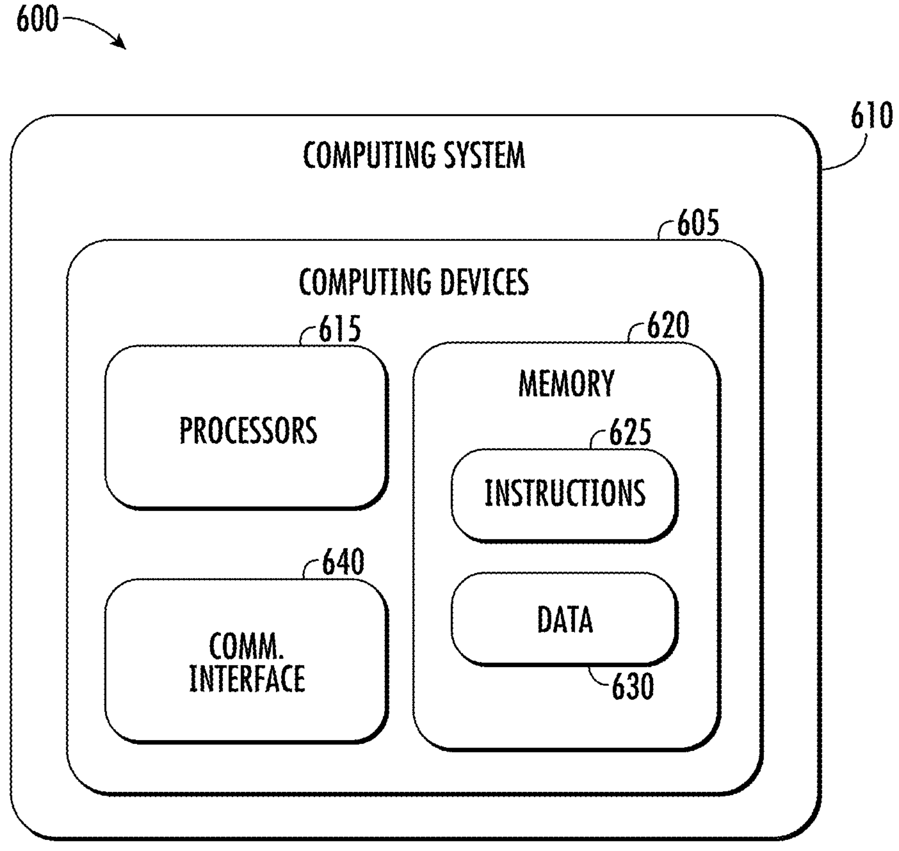
FIG. 6 depicts example system components according to example aspects of the present disclosure.

FIG. 6 depicts example system components according to example aspects of the present disclosure. The example system 600 illustrated in FIG. 6 is provided as an example only. The components, systems, connections, and/or other aspects illustrated in FIG. 6 are optional and are provided as examples of what is possible, but not required, to implement the present disclosure. The computing system 600 can be and/or include the vehicle computing system 110 of FIG. 1. The computing system 600 can be associated with a central operations system and/or an entity associated with the vehicle 105 such as, for example, a vehicle owner, vehicle manager, fleet operator, service provider, etc.

The computing device(s) 605 of the computing system 600 can include processor(s) 615 and at least one memory 620. The one or more processors 615 can be any suitable processing device (e.g., a processor core, a microprocessor, an ASIC, an FPGA, a controller, a microcontroller, etc.) and can be one processor or a plurality of processors that are operatively connected. The memory 620 can include one or more non-transitory computer-readable storage media, such as RAM, ROM, EEPROM, EPROM, one or more memory devices, flash memory devices, magnetic disks, data registers, etc., and combinations thereof.

The memory 620 can store information that can be accessed by the one or more processors 615. For instance, the memory 620 (e.g., one or more non-transitory computer-readable storage mediums, memory devices) can include computer-readable instructions 625 that can be executed by the one or more processors 615. The instructions 625 can be software written in any suitable programming language or can be implemented in hardware. Additionally, or alternatively, the instructions 625 can be executed in logically and/or virtually separate threads on processor(s) 615

For example, the memory 620 on-board the vehicle 105 can store instructions 625 that when executed by the one or more processors 615 cause the one or more processors 615 (e.g., in the vehicle computing system 110) to perform operations such as any of the operations and functions of the computing device(s) 605 and/or vehicle computing system 110 (and its sub-systems (e.g., the path alteration system 270, etc.)), any of the operations and functions for which the vehicle computing system 110 (and/or its subsystems) are configured, and/or any other operations and functions described herein.

The memory 620 can store data 630 that can be obtained (e.g., received, accessed, written, manipulated, created, generated, etc.) and/or stored. The data 630 can include, for instance, services data (e.g., trip data, route data, user data, etc.), sensor data, map data, perception data, prediction data, motion planning data, nominal path data, target zone data, and/or other data/information as described herein. In some implementations, the computing device(s) 605 can obtain data from one or more memories that are remote from the autonomous vehicle 105.

The computing device(s) 605 can also include a communication interface 640 used to communicate with one or more other system(s) (e.g., the remote computing system). The communication interface 640 can include any circuits, components, software, etc. for communicating via one or more networks (e.g., network(s)). In some implementations, the communication interface 640 can include, for example, one or more of: a communications controller, a receiver, a transceiver, a transmitter, a port, conductors, software, and/or hardware for communicating data.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for generating autonomous vehicle paths, the method comprising:

accessing map data for a geographic area, the map data including information associated with a nominal path;

obtaining data describing a target zone along the nominal path, wherein the target zone is an area which an autonomous vehicle is instructed to traverse before continuing to travel along a travelway;

identifying, based on data representing a position of one or more lane boundaries included in the map data, whether the target zone is at least partially outside the one or more lane boundaries;

altering, in accordance with the target zone being at least partially outside the one or more lane boundaries, the data representing the position of the one or more lane boundaries such that the target zone is within a space designated by altered data representing the position of the one or more lane boundaries;

generating, based on the altered data, an altered nominal path to traverse the target zone before continuing to travel along the travelway;

accessing perception data describing one or more objects in an environment of the autonomous vehicle;

generating a trajectory for the autonomous vehicle, the trajectory based on a target velocity, the one or more objects, and the altered nominal path; and controlling the autonomous vehicle based on the trajectory.

2. The computer-implemented method of claim 1, further comprising:

identifying a first coordinate in a series of coordinates that falls within the target zone;

identifying a last coordinate in the series of coordinates that falls within the target zone; and designating the first coordinate, the last coordinate, and any coordinates between the first and the last coordinates as being included in a region for a designated action, wherein the nominal path includes the series of coordinates, and the series of coordinates is associated with a series of time steps.

3. The computer-implemented method of claim 2, wherein the trajectory is generated based at least in part on the region for a designated action.

4. The computer-implemented method of claim 3, further comprising:

generating a longitudinal plan for the autonomous vehicle through the geographic area based on the altered nominal path; and generating a target velocity for one or more portions of the altered nominal path within the region for the designated action.

5. The computer-implemented method of claim 4, wherein the trajectory is generated based at least in part on the longitudinal plan.

6. The computer-implemented method of claim 2, wherein the designated action is a turn.

7. The computer-implemented method of claim 6, further comprising:

identifying a preferred turning velocity for the turn; and setting a target velocity for at least one portion of the nominal path within the region for the designated action to the preferred turning velocity.

8. The computer-implemented method of claim 2, further comprising:

laterally altering a plurality of coordinates in the region for the designated action such that the altered nominal path traverses the target zone.

9. The computer-implemented method of claim 8, wherein the method further comprises:

identifying that the altered nominal path does not satisfy at least one of an acceleration threshold or a velocity threshold; and laterally altering one or more coordinates outside the region for the designated action such that the nominal path satisfies the at least one acceleration threshold or velocity threshold.

10. The computer-implemented method of claim 9, wherein the nominal path represents a path through the environment of the autonomous vehicle without accounting for obstacles within the environment.

11. The computer-implemented method of claim 2, wherein the nominal path is precalculated prior to generating the trajectory.

12. The computer-implemented method of claim 11, wherein each geographic coordinate has an associated position and pose for the autonomous vehicle.

13. A computing system for altering vehicle paths, the system comprising:

one or more processors and one or more non-transitory computer-readable memories;

wherein the one or more non-transitory computer-readable memories store instructions that, when executed by the processor, cause the computing system to perform operations, the operations comprising:

accessing map data for a geographic area, the map data including information associated with a nominal path;

obtaining data describing a target zone along the nominal path, wherein the target zone is an area which an autonomous vehicle is instructed to traverse before continuing to travel along a travelway;

identifying, based on data representing a position of one or more lane boundaries included in the map data, whether the target zone is at least partially outside the one or more lane boundaries;

altering, in accordance with the target zone being at least partially outside the one or more lane boundaries, the data representing the position of the one or more lane boundaries such that the target zone is within a space designated by altered data representing the position of the one or more lane boundaries;

generating, based on the altered data, an altered nominal path to traverse the target zone before continuing to travel along the travelway;

accessing perception data describing one or more objects in an environment of the autonomous vehicle;

generating a trajectory for the autonomous vehicle, the trajectory based on a target velocity, the one or more objects, and the altered nominal path; and controlling the autonomous vehicle based on the trajectory.

14. The computing system of claim 13, wherein the nominal path represents a path through the environment of the autonomous vehicle without accounting for obstacles within the environment.

15. The computing system of claim 13, wherein each geographic coordinate has an associated position and pose for the autonomous vehicle.

16. An autonomous vehicle, comprising:

one or more processors; and one or more non-transitory computer-readable media that collectively store instructions that, when executed by the one or more processors, cause the one or more processors to perform operations, the operations comprising:

accessing map data for a geographic area, the map data including information associated with a nominal path;

obtaining data describing a target zone along the nominal path, wherein the target zone is an area which the autonomous vehicle is instructed to traverse before continuing to travel along a travelway;

identifying, based on data representing a position of one or more lane boundaries included in the map data, whether the target zone is at least partially outside the one or more lane boundaries;

altering, in accordance with the target zone being at least partially outside the one or more lane boundaries, the data representing the position of the one or more lane boundaries such that the target zone is within a space designated by altered data representing the position of the one or more lane boundaries;

generating, based on the altered data, an altered nominal path to traverse the target zone before continuing to travel along the travelway;

accessing perception data describing one or more objects in an environment of the autonomous vehicle;

generating a trajectory for the autonomous vehicle, the trajectory based on a target velocity, the one or more objects, and the altered nominal path; and controlling the autonomous vehicle based on the trajectory.

17. The autonomous vehicle of claim 16, the operations further comprising:

identifying a first coordinate in a series of coordinates that falls within the target zone;

identifying a last coordinate in the series of coordinates that falls within the target zone; and designating the first coordinate, the last coordinate, and any coordinates between the first and the last coordinates as being included in a region for a designated action, wherein the nominal path includes the series of coordinates, and the series of coordinates is associated with a series of time steps.

* * * * *